United States Patent
Kim et al.

(10) Patent No.: US 9,093,083 B1
(45) Date of Patent: Jul. 28, 2015

(54) ADAPTIVE READ CHANNEL SYSTEM FOR DIFFERENT NOISE TYPES

(71) Applicant: Seagate Technology LLC, Cupertino, CA (US)

(72) Inventors: Gukhui Kim, Seoul (KR); Seungyoul Jeong, Suwon-si (KR); Jiyoung Lee, Hwaseong-si (KP); Wonseo Park, Hwaseong-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/503,903

(22) Filed: Oct. 1, 2014

(51) Int. Cl.
*G11B 5/02* (2006.01)
*G11B 27/36* (2006.01)
*G11B 5/09* (2006.01)
*G11B 5/012* (2006.01)
*G11B 15/087* (2006.01)

(52) U.S. Cl.
CPC .............. *G11B 5/012* (2013.01); *G11B 15/087* (2013.01)

(58) Field of Classification Search
CPC ............ G11B 5/09; G11B 5/02; G11B 27/36; G11B 2220/90; G11B 15/087; G11B 5/012; G11B 20/225; G11B 20/100009
USPC ............ 360/25, 27, 31, 39, 55, 65, 76, 77.04, 360/66, 46, 53; 369/47.38; 704/234; 702/35; 324/210
See application file for complete search history.

(56) References Cited

U.S. PATENT DOCUMENTS

| | | | |
|---|---|---|---|
| 5,774,285 A | 6/1998 | Kassab et al. | |
| 6,104,766 A | 8/2000 | Coker et al. | |
| 6,158,027 A | 12/2000 | Bush et al. | |
| 6,275,346 B1 | 8/2001 | Kim et al. | |
| 6,556,006 B1 * | 4/2003 | Li et al. | 324/210 |
| 6,591,198 B1 * | 7/2003 | Pratt | 702/35 |
| 6,735,029 B2 | 5/2004 | Seng et al. | |
| 7,245,444 B2 * | 7/2007 | Galbraith et al. | 360/46 |
| 7,725,316 B2 * | 5/2010 | Chengalvarayan et al. | 704/234 |
| 7,885,151 B1 | 2/2011 | Mitchem et al. | |
| 7,911,901 B2 * | 3/2011 | Sutardja | 369/47.38 |
| 8,154,816 B1 * | 4/2012 | Voo | 360/66 |
| 8,233,570 B2 | 7/2012 | Heidari et al. | |
| 8,290,102 B2 | 10/2012 | Kaynak et al. | |
| 8,670,199 B2 | 3/2014 | Blinick et al. | |
| 8,719,682 B2 | 5/2014 | Han et al. | |
| 2014/0063637 A1 | 3/2014 | Pan et al. | |

OTHER PUBLICATIONS

Wikipedia; Noise-Predictive Maximum-Likelihood (NPML) Detection (https://en.wikipedia.org/wiki/Noise-Predictive_Maximum-Likelihood_(NPML)_Detection), last modifiied on Jul. 19, 2014, accessed on Sep. 30, 2014, 7 pgs.

* cited by examiner

*Primary Examiner* — Nabil Hindi
(74) *Attorney, Agent, or Firm* — Taylor English Duma LLP

(57) ABSTRACT

Technologies are described herein for adapting a read-signal in a read channel using pre-determined sets of adaptive parameter values optimized for different noise environments in a storage device. A read-signal is received in a read channel comprising at least one adaptive component. A most probable noise type is determined for the read channel, and a set of adaptive parameter values associated with the most probable noise type is retrieved from a memory. The read-signal is adapted for decoding using the at least one adaptive component configured with the retrieved set of adaptive parameter values.

18 Claims, 4 Drawing Sheets

ADAPTIVE READ CHANNEL SYSTEM FOR DIFFERENT NOISE TYPES

BRIEF SUMMARY

The present disclosure relates to technologies for adapting a read-signal in a read channel using pre-determined sets of adaptive parameter values optimized for different noise environments, such as that in a hard-disk drive ("HDD") device. According to some embodiments, a method for adapting a read-signal comprises receiving the read-signal in a read channel and determining a most probable noise type for the read channel. A set of adaptive parameter values associated with the most probable noise type is retrieved from a memory, and the read-signal is adapted for decoding using the retrieved set of adaptive parameter values.

According to further embodiments, an adaptive read channel system comprises a read channel including at least one adaptive component, a memory storing a plurality of sets of adaptive parameter values for the at least one adaptive component pre-determined for the read channel, and a processor operably connected to the memory and the at least one adaptive component. The processor is configured to determine whether a read error has occurred in the read channel, and, upon determining that the read error has occurred, determine a most probable noise type in a read-signal. A set of adaptive parameter values associated with the most probable noise type is retrieved from the plurality of sets of adaptive parameter values, and the read-signal is adapted for decoding using the at least one adaptive component configured with the retrieved set of adaptive parameter values.

According to further embodiments, a computer-readable medium has processor-executable instructions stored thereon that, when executed by a processor, cause the processor to determine whether an error has occurred in a read channel having at least one adaptive component, and upon determining that the error has occurred, retrieve a first set of adaptive parameter values from a plurality of sets of adaptive parameter values stored in a memory, the first set of adaptive parameter values associated with a most probable noise type in a read-signal. The processor then causes the read-signal to be adapted for decoding using the at least one adaptive component configured with the first set of adaptive parameter values. If it is determined that the data was not decoded from the read-signal successfully, a second set of adaptive parameter values associated with a next most probable noise type is retrieved from the plurality of sets of adaptive parameter values, and the read-signal is adapted for decoding using the at least one adaptive component configured with the second set of adaptive parameter values.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
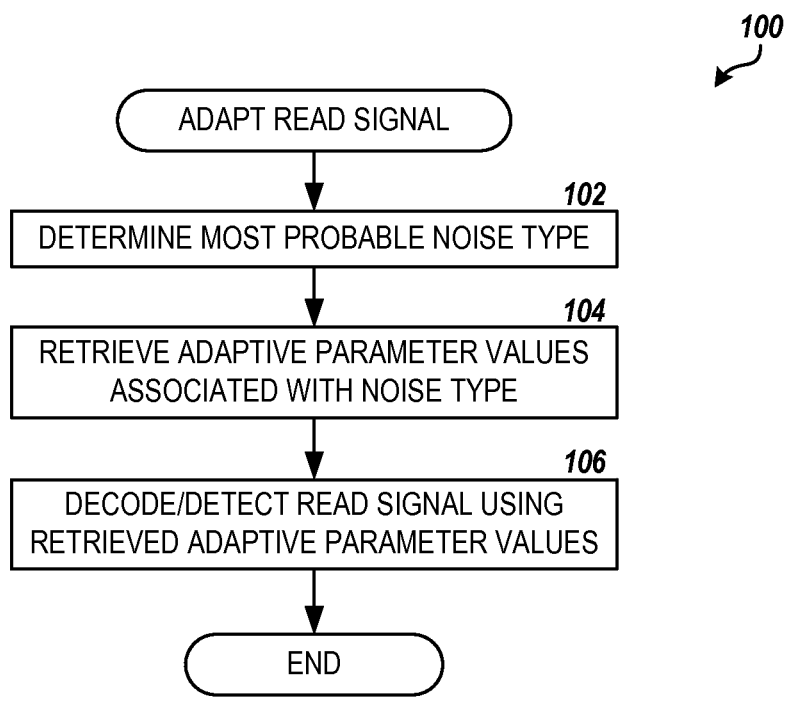
FIG. 1 is a flow diagram showing one routine for adapting a read-signal in a read channel using pre-determined sets of adaptive parameter values optimized for different noise environments, according to embodiments described herein.

The following detailed description is directed to technologies for adapting a read-signal in a read channel using pre-determined sets of adaptive parameter values optimized for different noise environments. The read channel may be implemented in a storage device, such as a hard-disk drive ("HDD") device. The HDD device may increase data detection and decoding performance by using a read channel architecture that may include one or more adaptive components and/or modules, such as digital finite impulse response ("FIR") filter or "equalizer," a noise-predictive maximum-likelihood ("NPML") detector, a variable-gain amplifier ("VGA"), and the like. The components and modules adapt the signal from the read channel to fit the implemented detection method. For example, the adaptation process may control the amplitude and phase of an input signal in order to improve its data detection performance.

During the read process, the components and modules may utilize parameter or coefficient values to drive the adaptation of the input signal to account for irregularities or conditions in the channel that may introduce noise. Accordingly, the parameters and coefficients of the adaptive read channel architecture may need to change in accordance with the channel environment. In a conventional adaptive system, an initial set of optimum parameter and coefficient values may be determined for the HDD by a process involving iteratively reading test data written to one or more data tracks while individual parameter values are changed to obtain a population of error rates for a range of parameter values. The optimum parameter values may then be selected from the range of parameter values.

If the condition of the channel later changes, such as by the introduction of new noise in the signal, the conventional process may be performed again to re-optimize the read channel parameters and coefficients for the new noise environment. The conventional optimization process, however, may require repetitive reading of the data from the recording medium of the HDD as well as a number of complex calculations, which may reduce detection performance when the noise environment of the HDD changes. Moreover, as the magnitude and or type of noise changes, the differences between the parameter and coefficient values associated with the input signal without any noise and those associated with the input signal with noise may also increase accordingly. If the change in noise is too big to properly adapt the parameters and coefficients using the conventional process, further read failures may ensue.

According to embodiments described herein, an adaptive read channel architecture may be implemented in a storage device that utilizes multiple, pre-determined sets of parameters and coefficients to adapt the read-signal for detection/decoding. Each set of parameters and coefficients may be associated with a type and/or character of noise that may occur in the read channel. When the noise environment of the storage device changes (e.g., when one or more read errors are detected), the most probable noise type may be determined and the associated set of parameter and coefficient values may be retrieved and utilized to adapt the channel to account for the noise in the read-signal.

If the read errors are not corrected, additional sets of parameter and coefficient values may be retrieved and utilized until the channel is appropriately adapted to the new noise (e.g., until the data is properly read). The adaptive read channel architecture of the present disclosure may improve the success rate of reading data in cases of read failures by using the previously determined sets of adaptive parameters or coefficients stored in the memory without requiring additional, iterative reads as are necessary with the conventional adaptation process. As a result, time-for-retries as well as read failure rates are reduced.

FIG. 1 provides an overview of an improved adaptive read channel architecture according to the embodiments described herein. Specifically, FIG. 1 illustrates one routine 100 for adapting a read-signal in a read channel using pre-determined sets of adaptive parameter values optimized for different noise environments. According to some embodiments, the routine 100 may be performed by a controller of the storage device when a read error occurs in the read channel. The routine 100 includes step 102, where the most probable type of the noise present in the read-signal is determined. Noise types may include noise introduced into the read-signal from off-track writes due to servo system anomalies, weak writing power being applied to the write head, inter-track interference ("ITI") from adjacent track(s), and the like. According to some embodiments, the probability of each noise type may be determined for a particular storage device at design time and stored with the sets of adaptive parameters, as described below. In other embodiments, the most probable noise type may be determined from the controller based on feedback received from the adaptive components of the read channel, such as feedback received from an NPML detector, for example. Additionally or alternatively, feedback from other systems in the storage device 200, such as the servo system, may be utilized to determine the most probably noise type.

Next, the routine 100 proceeds to step 104, where a set of adaptive parameter values associated with the determined noise type is retrieved from a memory of the storage device. According to embodiments described herein, multiple sets of optimal parameter and coefficient values may be pre-calculated for the adaptive read channel architecture for various noise environments that may occur during the read process in the storage device. As will be described in more detail below, adaptive parameter values may include NPML coefficients, FIR filter tap coefficients, and/or the like. The optimized adaptive parameter values may be stored in the memory associated with the specific type of noise. For example, the sets of adaptive parameter values may be stored in a flash memory of the storage device in the maintenance cylinder of the recording media.

From step 104, the routine 100 proceeds to step 106, where data is decoded from the read-signal adapted to the noise environment by the adaptive read channel architecture using the retrieved adaptive parameter values. In some embodiments, multiple sets of adaptive parameter values may be utilized to adapt the read-signal in an iterative fashion until the data is decoded successfully, as will be further described below. From step 106, the routine 100 ends.

Figure 2:
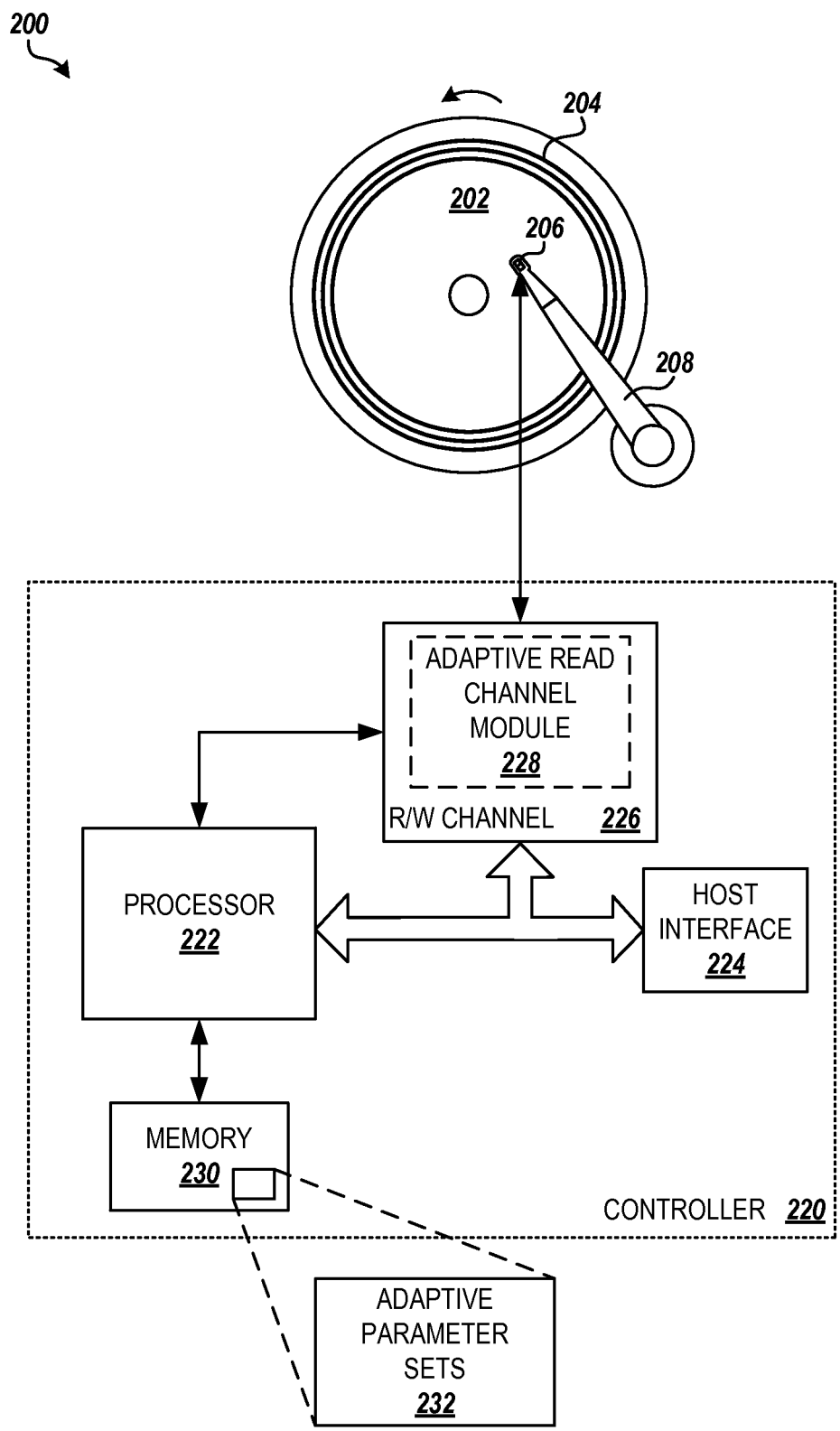
FIG. 2 is a block diagram showing an illustrative environment for adapting a read-signal in a read channel using pre-determined sets of adaptive parameter values optimized for different noise environments in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for adapting a read-signal in a read channel using pre-determined sets of adaptive parameter values optimized for different noise environments, according to the embodiments provided herein. The storage device 200 may include recording media comprising at least one platter or disk 202. The disk(s) 202 may include a magnetic recording surface divided or "formatted" into a number of individual data tracks, such as data track 204. The data tracks 204 may represent substantially concentric circular areas on the surface of the disk 202.

The storage device 200 further includes at least one read/write head 206 located adjacent to the recording surface of each disk 202. The read/write head 206 may read information from the disk 202 by sensing a magnetic field formed on portions of the surface of the disk, and may write information to the disk by magnetizing a portion of the surface of the disk. The read/write head 206 may be located at the distal end of an arm 208 that rotates in order to reposition the read/write head 206. The read/write head 206 may incorporate multiple components not shown in the figure or described herein, including reader elements, such as magneto-resistive ("MR") readers, tunneling MR readers, or the like, writer elements, head heaters, air bearings, and the like.

The storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 206 and to the surface of the disk 202. The processor 222 may further process read commands from the host device by determining the location of the desired data on the surface of the disk 202, moving the read/write head(s) 206 over the determined location, reading the data from the surface of the disk via the read/write channel 226, correcting any errors and formatting the data for transfer to the host device.

The read/write channel 226 may convert data between the digital signals processed by the processor 222 and the analog read and write signals conducted through the read/write head 206 for reading and writing data to the surface of the disk 202. The analog signals to and from the read/write head 206 may be further processed through a pre-amplifier circuit. The read/write channel 226 may further provide servo data read from the disk 202 to an actuator to position the read/write head 206. The read/write head 206 may be positioned to read or write data to a specific location on the on the recording surface of the disk 202 by moving the read/write head 206 radially across the data tracks 204 using the actuator while a motor rotates the disk to bring the target location under the read/write head.

According to embodiments, the controller 220 may further contain an adaptive read channel module 228. According to embodiments, the adaptive read channel module 228 receives the read-signal from the read/write head 206 and adapts the signal for the detection/decoding mechanism implemented in the storage device 200. The adaptive read channel module 228 may comprise hardware circuits in the read/write channel 226, processor-executable instructions for execution in the processor 222 or any combination of these and other components in the controller 220. The adaptive read channel module 228 may implement the various sub components described herein for adapting a read-signal in a read channel using pre-determined sets of adaptive parameter values optimized for different noise environments.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 230 may further comprise a portion of the storage media of the storage device 200, such as the maintenance cylinder ("M/C") of the disk 202. For example, the memory 230 may store a firmware that comprises commands and data necessary for performing the operations of the storage device 200. According to some embodiments, the memory 230 may store processor-executable instructions that, when executed by the processor, perform the routines 100, 400, and 500 for adapting a read-signal in a read channel using pre-determined sets of adaptive parameter values optimized for different noise environments of the storage device 200, as described herein.

In some embodiments, the memory 230 may store adaptive parameter sets 232 utilized by the adaptive read channel module 228 to adapt the read-signal received from the read/write head 206 for a current noise environment. The adaptive parameter sets 232 include multiple sets of adaptive parameter and coefficient values optimized for different noise environments of the storage device 200. According to some embodiments, each set of adaptive parameter and coefficient values may include NPML coefficients, FIR filter tap coefficients, and/or the like. In further embodiments, the adaptive parameter and coefficient values may include other parameter values utilized by adaptive read channel architecture components known in the art, such as an MR bias parameter (voltage or current), an optimized cutoff frequency (Fc) and/or boost frequency (Fb) of continuous time filter and the like.

According to embodiments, each set of adaptive parameter values is associated with the noise type for which the parameter values were optimized. In some embodiments, the adaptive parameter sets 232 may be generated by simulation of the various noise environments of the adaptive read channel architecture of the storage device when the storage device is being designed. In other embodiments, the adaptive parameter sets 232 may be generated during a "burn-in" or certification ("CERT") processing of a particular storage device 200 by simulating the various noise environments and utilizing the conventional adaptation process described above to create optimized parameter and coefficient values for each noise type, as will be described below in regard to FIG. 4. In further embodiments, the adaptive parameter sets 232 may be stored in some other computer-readable storage media in or accessible to the controller 220, including in the M/C of the disk 202.

In addition to the memory 230, the environment may include other computer-readable media storing program modules, data structures, and other data described herein for adapting a read-signal in a read channel using pre-determined sets of adaptive parameter values optimized for different noise environments of the storage device 200. It will be appreciated by those skilled in the art that computer-readable media can be any available media that may be accessed by the controller 220 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure and/or functionality of the storage device 200 may be different than that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 3:
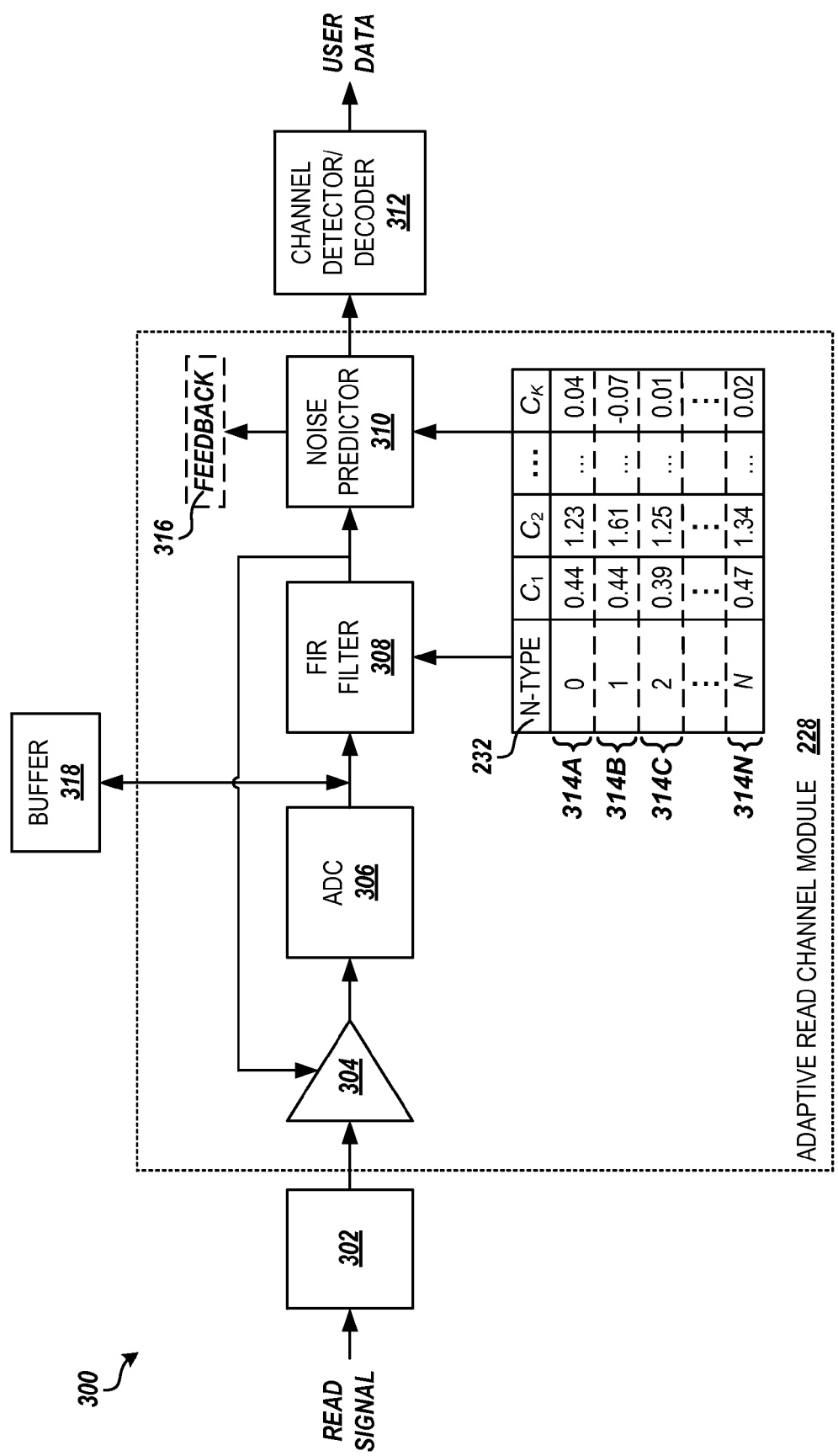
FIG. 3 is a block diagram showing additional details of an adaptive read channel architecture for adapting a read-signal in a read channel using pre-determined sets of adaptive parameter values, according to embodiments described herein.

FIG. 3 provides additional details of an adaptive read channel architecture 300 for adapting a read-signal in a read channel using pre-determined sets of adaptive parameter values, according to embodiments. During a read operation by the storage device, the read-signal from the read/write head 206 may pass through signal pre-processing elements 302 before being received at the adaptive read channel module 228. The pre-processing elements 302 may include a pre-amplifier and the like. The adaptive read channel module 228 may include a variable-gain amplifier ("VGA") 304. The VGA 304 is used to maintain a constant signal amplitude for the read-signal into the adaptive read channel module 228 while the input to the VGA 304 varies in amplitude.

The output of the VGA 304 is coupled to an analog-to-digital converter ("ADC") 306 which transfers a digitized (sampled) read-signal to an input of a digital finite impulse response ("FIR") filter 308. In some embodiments, the digitized read-signal from the ADC 306 may also be stored in a buffer 318. The FIR filter 308 may filter and condition the samples received from ADC 306. The FIR filter 308 may also be referred to as an "equalizer." The filtered signal may then pass to a noise predictor 310. In some embodiments, the noise predictor 310 may employ Noise-Predictive Maximum-Likelihood ("NPML") methods to minimize the influence of noise in the detection process. The read-signal is then sent to the channel detector/decoder 312 where the user data is decoded from the adapted read-signal. For example, the channel detector/decoder 312 may include a Viterbi detector that provides digital signals which may be decoded by a channel decoder to produce the user data for the host computer in response to the read command.

In general, the output signal of the adaptive read channel module 228 sent to the channel detector/decoder 312 is based on the input read-signal and a set of adaptive parameter or coefficient values, such as sets of adaptive parameters 314A-314N (referred to herein generally as set of adaptive parameters 314), used by the components to adapt the read-signal. In some embodiments, the set of adaptive parameters 314 comprises NPML predictor coefficients for the noise predictor 310. In further embodiments, the set of adaptive parameters 314 may also include tap coefficients for the FIR filter 308 and/or other parameter and coefficient values utilized by the components of the adaptive read channel module 228.

According to embodiments, the storage device 200 contains multiple sets of adaptive parameters 314 in the adaptive parameter sets 232 stored in the memory 230 or other storage area of the device. Each set of adaptive parameter 314 values may be associated with a noise type for which the parameter and coefficient values have been optimized. Noise types may include 10% off-track write, 20% off-track write, weak writing power applied to the read/write head 206 during the write, inter-track interference ("ITI") from adjacent track(s), and any other type or failure or condition that may cause noise in the read-signal that may result in a read error. In some embodiments, the adaptive parameter sets 232 may further contain a default or generic set of adaptive parameters 314 optimized for the adaptive read channel architecture outside of a particular noise condition. As may be seen in FIG. 3, the adaptive parameter sets 232 may include N sets of adaptive parameters 314A-314N, each containing K coefficient or parameter values.

According to embodiments, the adaptive read channel module 228 may utilize the set of adaptive parameters 314 best suited to the current noise environment of the storage device 200 when performing a read operation. The current noise environment, i.e. the current noise type, may be determined from feedback 316 from the noise predictor and/or other components of the adaptive read channel module 228, according to some embodiments. For example, the set of adaptive parameters 314 associated with the noise type of the current noise environment may be retrieved from the adaptive parameter sets 232 and used by the adaptive read channel module 228 to perform the adaptation and decoding processes. As will be described below in regard to FIG. 5, if a read error occurs, the decoding of the read-signal output from the ADC 306 and stored in the buffer 318 may be repeatedly performed using different sets of adaptive parameters 314 without requiring additional reads of the recording medium.

In further embodiments, when determination of the noise type is difficult or resource intensive, the set of adaptive parameters 314 associated with the most probable noise type may be retrieved and utilized to adapt the read-signal if there is a read error or failure, and then the set of adaptive parameters for the next most probable noise type may be used if the former adaptive parameters do not correct the error. This process may be repeated until the data is decoded or read properly. Since only adaptation and decoding of the read-signal from the buffer 318 are needed and no additional reads are required, where the time for the decoding is much shorter than a typical read process, the decoding can be repeatedly performed using various sets of adaptive parameters 314 before the next read-retry attempt.

It will be appreciated that the components of the adaptive read channel module 228 may be different than that illustrated in FIG. 3 and described herein. For example, the adaptive read channel module 228 may contain multiple, parallel signal paths, each containing separate adaptive components and feeding separate channel detector/decoders 312 so that the read-signal may be adapted and decoded using multiple sets of adaptive parameters simultaneously. Similarly, the illustrated connection pathways are provided for purposes of illustration and not of limitation, and some components and/or interconnections may be omitted for purposes of clarity.

Figure 4:
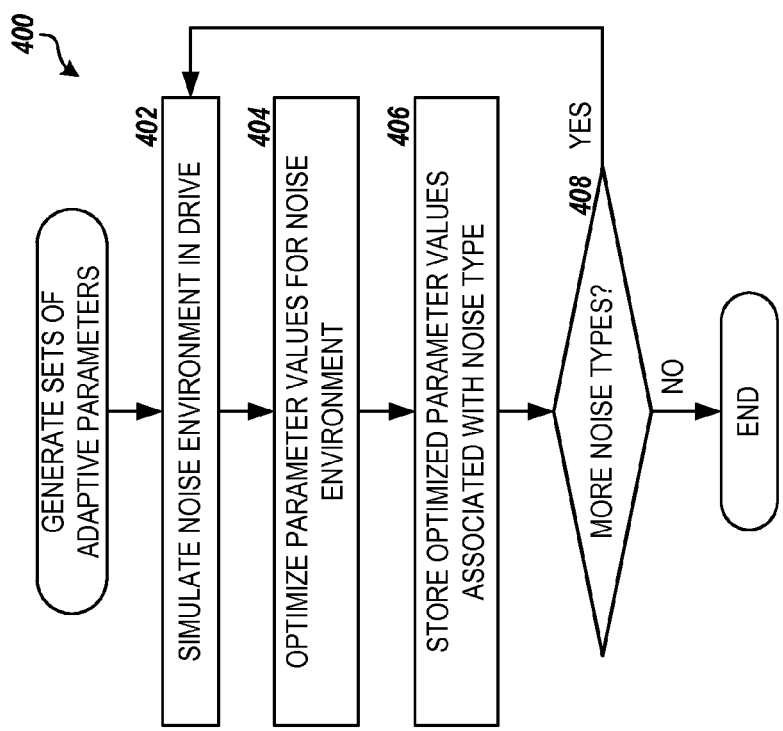
FIG. 4 is a flow diagram showing one routine for generating sets of adaptive parameters for a storage device incorporating an adaptive read channel architecture according to embodiments described herein.

FIG. 4 illustrates one routine 400 for generating sets of adaptive parameters 314 for a storage device 200, according to some embodiments. The routine 400 may be performed for storage devices implementing the adaptive read channel architectures 300 described herein. According to some embodiments, the routine 400 may be performed by the controller 220 of the storage device 200 or by an external computing system operably connected to the storage device during the CERT processing to generate the adaptive parameter sets 232 for the adaptive read channel module 228 of the device. In other embodiments, the routine 400 may be performed by a computer system hosting a read channel simulator during the design of a storage device 200. In further embodiments, the routine 400 may be performed by some other combination of modules, processors and devices.

The routine 400 begins at step 402, where a particular noise environment is simulated in the storage device 200. The noise environment may be simulated in the read channel of a particular storage device 200, or the noise environment may be simulated in a read channel simulator configured to simulate the read channel of a storage device 200. For example, to simulate a noise type of 20% off-track write, the controller 220 of the storage device 200 may write test data to the recording medium at 20% off-track position using the servo system of the device.

Next, the routine 400 proceeds from step 402 to step 404, where optimal parameter and coefficient values for the adaptive read channel architecture components are calculated for the current noise environment of the storage device 200. In some embodiments, the adaptive read channel module 228 may perform the conventional adaptation process described above while reading data in the simulated noise environment. As further described above, calculation of the optimal coefficient values using the conventional adaptation process may require multiple reads and resource intensive calculations by the processor of the storage device. In other embodiments, optimal parameter and coefficient values may be calculated mathematically based on the structure and function of the components of adaptive read channel module 228 operating in the simulated noise environment.

From step 404, the routine 400 proceeds to step 406, where the optimal parameter and coefficient values for the current noise environment are stored in the storage device 200. According to embodiments, the optimal parameter and coefficient values are stored as a set of adaptive parameters 314 in the adaptive parameter sets 232 in the memory 230 or other storage area of the storage device 200. The set of adaptive parameters 314 is associated with the noise type of the current noise environment simulated in the storage device 200 in order to allow for later retrieval based on noise type. In some embodiments, the set of adaptive parameters 314 is further configured with a priority or probability of the associated noise type in the storage device 200. For example, the sets of adaptive parameters 314 may be stored in the adaptive parameter sets 232 in an order of most probably noise type to least probable noise type.

The routine 400 proceeds from step 406 to step 408, where it is determined whether more noise types exist for which the generation of optimal parameter and coefficient values is desired. If more noise types exist, then the routine 400 returns to step 402, where the process is repeated for the next noise type. For example, according to some embodiments, the routine 400 may be executed for all N noise types described above in regard to FIG. 3 in order to generate N sets of adaptive parameters 314. Once all of the noise types have been processed and the adaptive parameter sets 232 are complete, the routine 400 then ends.

Figure 5:
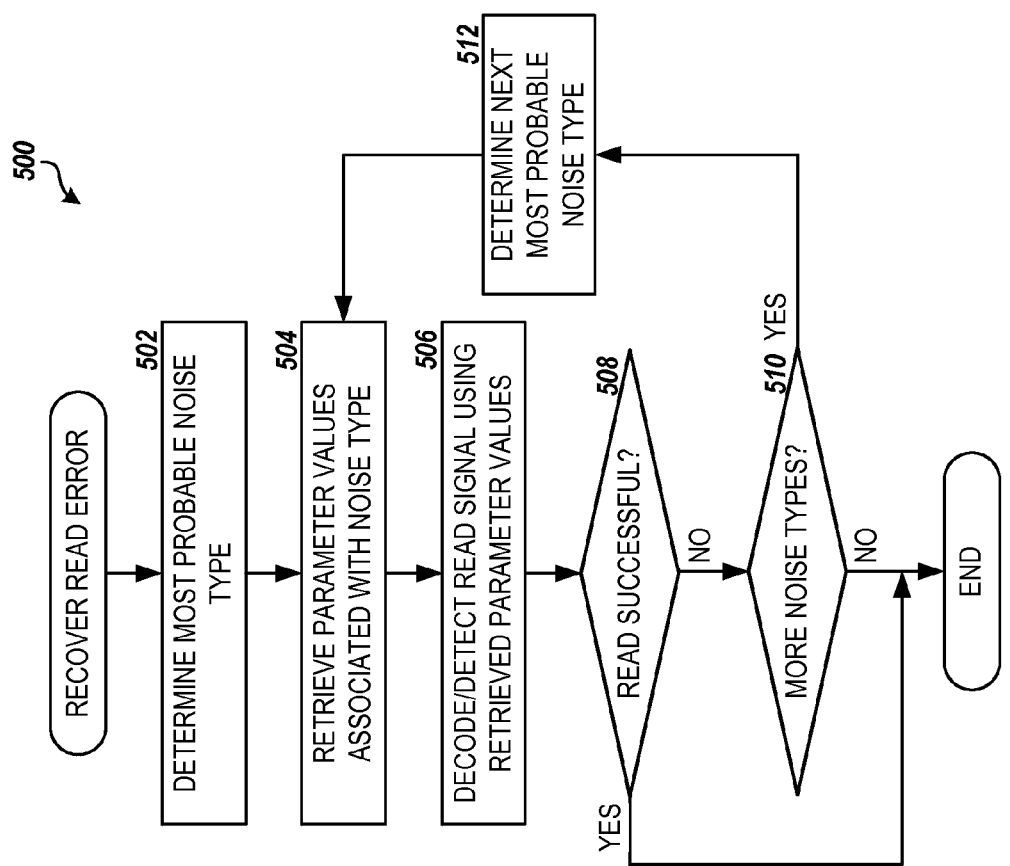
FIG. 5 is a flow diagram showing another routine for adapting a read-signal in a read channel using pre-determined sets of adaptive parameter values optimized for different noise environments, according to embodiments described herein.

FIG. 5 illustrates a routine 500 for adapting a read-signal in a read channel using pre-determined sets of adaptive parameter values optimized for different noise environments, according to some embodiments. According to embodiments, the routine 500 may be performed by the adaptive read channel module 228 of a storage device 200 during a read-retry operation. In further embodiments, the routine 500 may be performed by the controller 220 of the storage device 200, by external processors or computing systems performing storage processing in the storage device, or some other combination of modules, processors and devices.

The routine 500 begins at step 502, where the adaptive read channel module 228 determines a most probable noise type in the read-signal received from the read/write head 206. According to some embodiments, the probability of noise types may be determined at design time for the storage device 200, and the set of adaptive parameters 314 associated with each noise type may be stored in the adaptive parameter sets 232 associated with a probability of the noise type, e.g., in an order of most probable noise type to least probable noise type. In this way, the adaptive read channel module 228 may adapt the read-signal in an iterative fashion using multiple sets of adaptive parameters 314 in the order in which they appear in the adaptive parameter sets 232. In other embodiments, the adaptive read channel module 228 may determine the most probable noise type based on feedback received from the noise predictor 310 or other components of the adaptive read channel module. For example, an analysis of the output signal from the noise predictor may indicate a type of noise present in the read-signal. In further embodiments, the most probable noise type may be determined by the processor 222 of the controller 220 utilizing feedback from other components of the storage device, such as the servo system.

From step 502, the routine 500 proceeds to step 504, where the adaptive read channel module 228 retrieves the set of adaptive parameters 314 associated with the most probable noise type from the adaptive parameter sets 232 and provided to the respective components of the adaptive read channel architecture. At step 506, the read-signal from the read/write head 206 is adapted to the current noise environment of the read channel by the adaptive read channel module 228 utilizing the retrieved set of adaptive parameters 314, and user data is decoded from the adapted signal in the channel detector/decoder 312.

As shown at step 508, if the user data is decoded successfully, i.e., the read is successful, then the routine 500 ends. If the read is not successful, the routine 500 proceeds to step 510, where the adaptive read channel module 228 determines whether additional sets of adaptive parameters 314 exist in the adaptive parameter sets 232 associated with more noise types. If additional sets of adaptive parameters 314 are available, the routine 500 proceeds to step 512, where the data read channel module 228 determines the next most probable noise type. As described above, this may simply involve selecting the next set of adaptive parameters 314 from the adaptive parameter sets 232 based on the order in which they are stored. From step 512, the routine 500 returns to step 504, where the process is repeated utilizing the next retrieved set of adaptive parameters 314. The routine 500 may be repeated in this iterative fashion until either the read is successful at step 508 or no more sets of adaptive parameters 314 are available.

Based on the foregoing, it will be appreciated that technologies for adapting a read-signal in a read channel using pre-determined sets of adaptive parameter values optimized for different noise environments are presented herein. While embodiments are described herein in regard to an HDD device having an adaptive read channel architecture, it will also be appreciated that the embodiments described in this disclosure may be utilized in the read channel of any other communication or storage device having an adaptive system comprising a FIR filter, a NPML predictor, and/or the like. This may include a magnetic disk drive, a hybrid magnetic and solid state drive, a magnetic tape drive, an optical disk drive, a communications receiver or transceiver device, and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
receiving a read-signal in a read channel;
determining a most probable noise type for the read channel;
retrieving a first set of adaptive parameter values associated with the most probable noise type from a memory;
adapting the read-signal for decoding using the first set of adaptive parameter values;
upon a failure to decode data from the read-signal, determining a next most probable noise type for the read channel;
retrieving a second set of adaptive parameter values associated with the next most probable noise type from memory; and
retrying decoding of data from the read-signal using the second set of adaptive parameter values.

2. The method of claim 1, further comprising the steps of:
predetermining a plurality of sets of adaptive parameter values for the read channel, each set of adaptive parameter values associated with a noise type; and
storing the plurality of sets of adaptive parameter values in the memory.

3. The method of claim 2, wherein determining the most probable noise type comprises retrieving the first set of adaptive parameter values from the plurality of sets of adaptive parameter based on a pre-determined probability of the noise type in the read channel.

4. The method of claim 1, wherein determining the most probable noise type comprises using feedback from the read channel to determine a current noise environment for the read channel.

5. The method of claim 1, wherein the read-signal is buffered in the read channel and retrying the decode of the data from the read-signal using the second set of adaptive parameter values does not require another read.

6. The method of claim 1, wherein the read channel comprises a noise-predictive maximum-likelihood ("NPML") filter and the first set adaptive parameter values comprises NPML predictor coefficients.

7. The method of claim 1, wherein the read channel comprises a digital finite impulse response ("FIR") filter and the first set adaptive parameter values comprises FIR filter tap coefficients.

8. The method of claim 1, wherein the noise types comprise an off-track read of a specific off-track amount.

9. The method of claim 1, wherein the noise types comprise adjacent track interference.

10. An adaptive read channel system comprising:
a read channel including at least one adaptive component;
a memory storing a plurality of sets of adaptive parameter values for the at least one adaptive component; each set of adaptive parameter values pre-determined for the read channel and associated with a noise type; and
a processor operably connected to the memory and the at least one adaptive component and configured to
determine whether a read error has occurred in the read channel,
upon determining that the read error has occurred, determine a most probable noise type in a read-signal,
retrieve a first set of adaptive parameter values associated with the most probable noise type from the plurality of sets of adaptive parameter values,
adapt the read-signal for decoding using the at least one adaptive component configured with the first set of adaptive parameter values,
upon a failure to decode data from the read-signal, determine a next most probable noise type for the read channel,
retrieve a second set of adaptive parameter values associated with the next most probable noise type from the plurality of sets of adaptive parameter values, and
adapt the read-signal for decoding using the at least one adaptive component configured with the second set of adaptive parameter values.

11. The adaptive read channel system of claim 10, wherein determining the most probable noise type comprises retrieving the first set of adaptive parameter values from the plurality of sets of adaptive parameter values based on a pre-determined probability of the associated noise type for the read channel.

12. The adaptive read channel system of claim 10, wherein determining the most probable noise type comprises using feedback from the read channel to determine a current noise environment for the read channel.

13. The adaptive read channel system of claim 10, wherein the at least one adaptive component comprises a noise-predictive maximum-likelihood ("NPML") filter and the plurality of sets of adaptive parameter values comprises NPML predictor coefficients.

14. The adaptive read channel system of claim 10, wherein the at least one adaptive component comprises a digital finite impulse response ("FIR") filter and the plurality of sets of adaptive parameter values comprises FIR filter tap coefficients.

15. A non-transitory computer-readable medium having processor-executable instructions stored thereon that, when executed by a processor, cause the processor to:
determine that an error has occurred in a read channel having at least one adaptive component;
upon determining that the error has occurred, retrieve a first set of adaptive parameter values from a plurality of sets of adaptive parameter values stored in a memory, the first set of adaptive parameter values associated with a most probable noise type in a read-signal;
adapt the read-signal for decoding using the at least one adaptive component configured with the first set of adaptive parameter values;
determine whether data was decoded from the read-signal successfully;
upon determining that data was not decoded from the read-signal successfully, retrieve a second set of adaptive parameter values from the plurality of sets of adaptive parameter values, the second set of adaptive parameter values associated with a next most probable noise type in the read-signal; and
adapt the read-signal for decoding using the at least one adaptive component configured with the second set of adaptive parameter values.

16. The computer-readable medium of claim 15, wherein the read-signal is buffered in the read channel and retrying the decode of the data from the read-signal using the second set of adaptive parameter values does not require another read.

17. The computer-readable medium of claim 15, wherein the at least one adaptive component comprises a noise-predictive maximum-likelihood ("NPML") filter and the plurality of sets of adaptive parameter values comprises NPML predictor coefficients.

18. The computer-readable medium of claim 15, wherein the read channel is implemented in a hard-disk drive device.

* * * * *